United States Patent [19]
Morrison

[11] 3,924,388
[45] Dec. 9, 1975

[54] EYE PROTECTION DEVICE FOR AMINALS

[76] Inventor: Anna Mae Elsie Morrison, 901 W. McDowell Road, Phoenix, Ariz. 95007

[22] Filed: June 19, 1974

[21] Appl. No.: 480,718

[52] U.S. Cl. .................................................. 54/80
[51] Int. Cl.² ............................................ B68C 5/00
[58] Field of Search ................ 119/143, 142; 54/80; 2/14 V, 14 B; 128/163, 76.5

[56] References Cited
UNITED STATES PATENTS
2,407,029  9/1946  Miller ..................................... 54/80
FOREIGN PATENTS OR APPLICATIONS
481,252   3/1954   Italy
1,278,860 11/1961  France Primary Examiner—Hugh R. Chamblee
Attorney, Agent, or Firm—Gregory J. Nelson

[57] ABSTRACT

An eye protection device especially adapted for protecting animals' eyes when applying pesticides, insecticides, and other chemicals externally is disclosed. The device includes a flexible mask portion adapted to fit snugly over the face portion of the animal. A transparent eye shield goggle member is provided in the mask at a location adjacent the animal's eyes when the mask is in place. Straps secured to the mask are adapted to extend around the animal's head to secure the mask in place.

1 Claim, 4 Drawing Figures

EYE PROTECTION DEVICE FOR AMINALS

The present invention pertains to an eye protection device, and more particularly, to an eye protection device especially adapted for use when applying insecticides and similar treatments to both domestic and farm animals.

The proper care of domestic pets, such as dogs and cats, often requires periodic treatment to protect the animal against infestation by ticks, fleas and various other parasites. Infestation of these parasites can be a serious health problem to animals. Attempts by domestic animals to rid themselves of ticks may produce open sores, which in turn may become infected and infested. Accordingly, most pet owners occassionally treat their pets with an appropriate insecticide or pesticide to protect the animal or rid the animal of the problem. When treating small animals, such as dogs and cats, the treatment should be effective to penetrate the animal's coat. To accomplish this, the animal is usually treated with the acaricide in the form of a wash, dust or spray. Aerosol sprays which are commercially available in most pet and veterinary supply shops are particularly popular because of their convenience and effectiveness. Similarly, application of dusts or powders is also commonly used. The acaricides generally contain lindane or malathion or compounds of organic phosphorous. All of these compounds can be particularly irritating and even damaging to the sensitive eyes of the animals. Inflamation and infection to the eyes can result and possible permanent damage can occur when the eyes are inadvertently sprayed or otherwise come in contact with the treating agent of this type.

Similarly, fleas, ticks and other parasites and insects are a major problem to breeders and raisers of farm animals. Infestation by insects and parasites has been known to result in substantial loss of production. Treatment of commercial herds or flocks is usually accomplished by spraying or dipping the animals in an appropriate solution of suspension. The solution or suspension may be selected from a wide range of commercially available insecticides or pesticides and usually is some form of rotenone, lindane, malathion or toxaphene. All of these chemicals can be extremely damaging to the animal's eyes if the eyes come in contact with the agent during application. Accordingly, great care must be used in applying these chemicals to the animal to avoid such contact. Therefore, from the foregoing, it becomes clearly apparent that there is a need for a device which provides protection to an animal's eyes while the animal is undergoing external treatment using a spray, dust or wash containing substances which may be irritating or damaging to the eyes of the animals. In the past, the users of such substances have had to rely on careful application to avoid bringing the animal's eyes into contact with the treating substance. This has not been entirely satisfactory as animals often become frightened during treatment and become difficult to handle, causing the user to inadvertently bring the substance into contact with the animal's eyes. Masks or shields for the protection of animals have, in the past, been used to protect the animal from flies and other insects. Generally, these masks have some sort of cover shaped to fit over the head and face of the animal, having an open mesh or screen adjacent the eyes of the animals to allow the animal to see, while still protecting the animal's face from flies and other insects. Such masks are not designed to prevent sprays, dusts and liquids from entering into contact with the animal's eyes and serve only a limited purpose of protecting the animal against flying insects.

Accordingly, from the foregoing, it is clearly apparent that a need exists for a device for protecting animals' eyes when applying treatments in the form of sprays, dusts and the like. To this end, the present invention provides an animal eye protector especially adapted for this purpose. The eye protector of the present invention includes a flexible mask designed to fit snugly across the animal's face in the area of the animal's eyes. A head strap and jaw strap connect to the mask and serve to hold the mask in place. A transparent eye goggle or shield is provided in the mask portion at a location adjacent the animal's eyes to permit unobstructed vision. The mask may be constructed from a wide variety of materials for permanent or disposable use.

Other advantages and features of the present invention will become apparent from a reading of the following specification, claims and drawings, in which:

Figure 1:
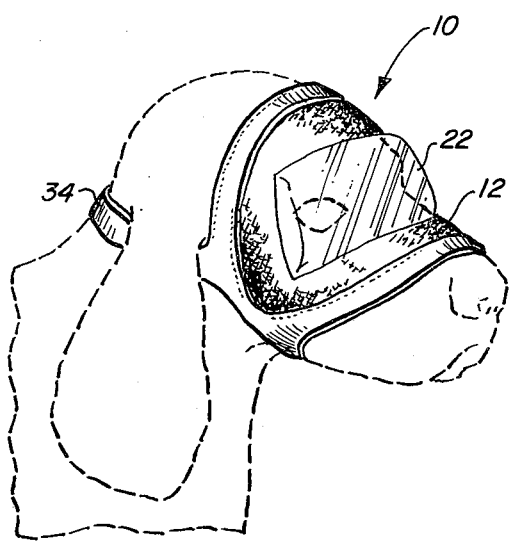
FIG. 1 is a partial topographical, anatomical view of a dog's head showing the mask of the present invention in place.
Figure 2:
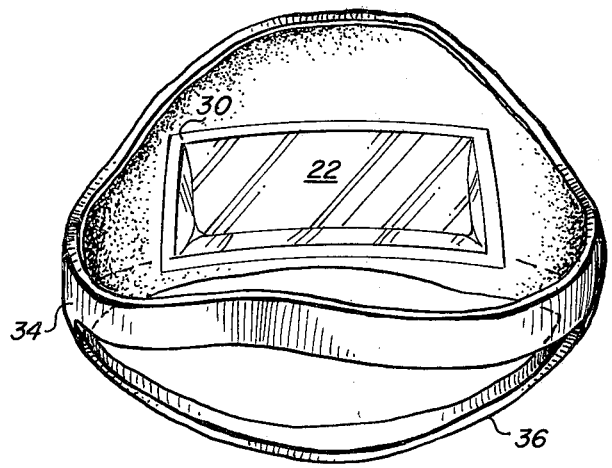
FIG. 2 is a front view of the protection device of the present invention, viewed from the interior of the mask.
Figure 3:
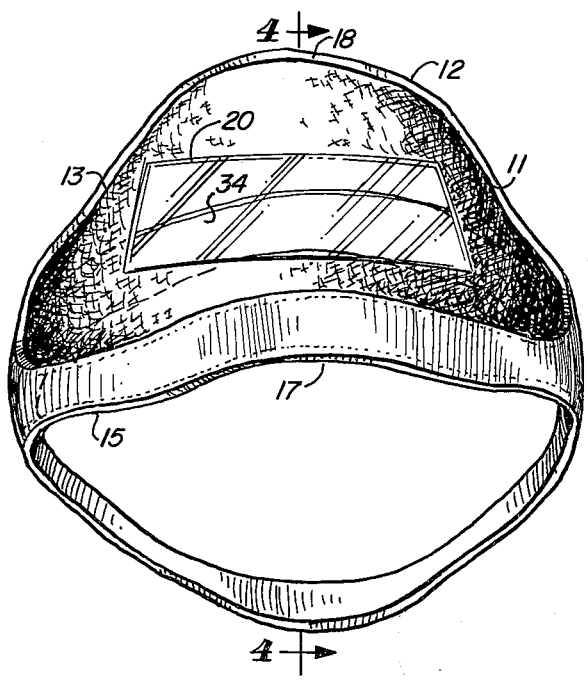
FIG. 3 is a front view of the device of the present invention, viewed from the interior of the mask.
Figure 4:
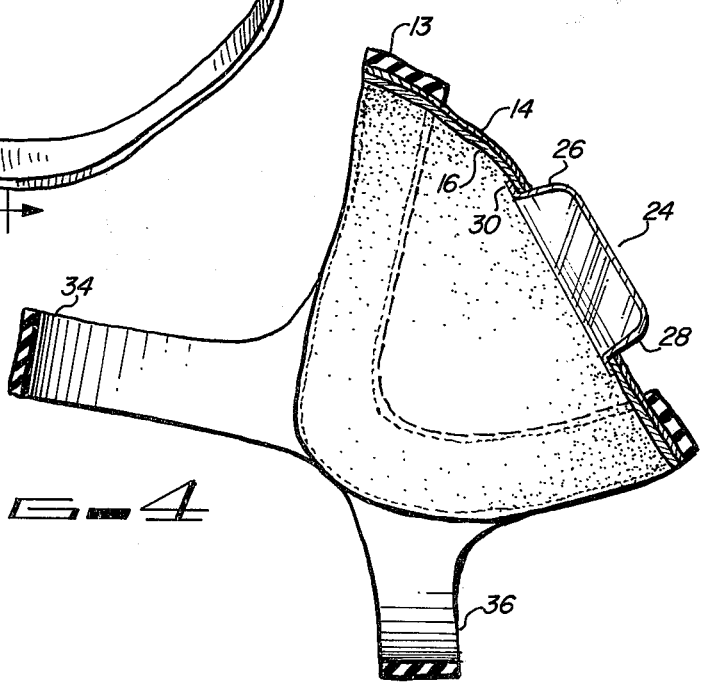
FIG. 4 is a sectional view taken along line 4—4 of FIG. 2, which more particularly illustrates the constructional details of the device of the present invention.

Turning now to the drawings, FIG. 1 shows the device of the present invention, generally designated by the numeral 10, positioned on the face of an animal. A dog is shown for illustrative purposes, but it will be appreciated that the eye protector of the present invention can be used with a wide variety of domestic and farm animals. As best seen in FIG. 2 and 3, the eye protector 10 of the present invention includes a mask portion 12 having edges 11, 13 and 15, which form a generally triangular configuration. The configuration of the mask may vary somewhat with the intended use; however, it has been found that the generally triangular configuration or contour is suitable for most animals. Preferably, the lower edge 15 of the mask portion 12 is slightly convex at 17 when the mask is flat, as best seen in FIGS. 2 and 3, so that this edge snugly fits against the lower face and cheeks of the animal.

The material of the mask should be flexible to provide the snug fit and should be substantially impervious or non-porous so as to prevent infiltration of liquids, dusts and sprays. Typically, for long-term reusable applications, the material of the mask might be layered, having an outer shell 14 of elastic or fabric and an inner lining 16 of rubber. The inner lining 16 will serve to prevent infiltration of substances and will also have sufficient frictional characteristics so as to prevent the mask from slipping when in position.

The device of the present invention may also have substantial professional and commercial use. For professional or commercial use, the material of the mask could be an inexpensive treated paper so that after use, the item could be discarded.

In order to give the mask a finished appearance, an edging 18 made of elastic, leather or trim material extends completely around the peripheral edge of the mask and is stitched in place. The edging serves to secure the layered structure of the mask together and covers the exposed raw edges of the mask 12.

An opening 20, generally rectangular in shape, is defined in the center portion of the mask 12. The opening 20 is at a location adjacent the eyes of the animal when the mask is in position. The size of opening 20 should be sufficient to permit the animal relatively free, unobstructed vision. Transparent eye shield or goggle member 22 cooperates with opening 20. Goggle portion 22 is preferably a molded unitary piece of plastic, such as acrylic, plexiglass or glass. Transparent goggle 22 has a generally convex viewing surface 24 and segmented semi-circular upper and lower surfaces 26 and 28. Peripheral flange 30 extends around the goggle portion 22 and is adapted to engage the inner surface of lining 16 in the area around opening 20. Goggle member 22 may be secured to the mask by an appropriate adhesive or by stitching.

Appropriate head and jaw straps 34 and 36, respectively, are provided for removably holding the mask in place on the animal. Head strap 34 is preferably of a stretchable, elastic material and is joined to the mask by stitching or similar procedure at opposite edges 11 and 13 at locations generally adjacent the goggle 22. Similarly, jaw strap 36 is of a resilient, elastic material and is joined to the mask by stitching at opposite ends of lower edge 15. Straps 34 and 36 alternately may be of the buckle or fastener type.

A more complete understanding of the present invention will be had from the following description of use of the eye protection device of the present invention as used in conjunction with a dog. When the pet owner desires to treat the pet with a suitable insecticide, as for instance an aerosol spray, the owner will position the mask on the face of the animal. Head strap 34 is engaged, as best seen in FIG. 1, on the crest of the neck of the animal. Lower jaw strap 36 is engaged beneath the jaw of the animal. It will be noted that the ears of the dog are allowed to project in the opening between the head strap and the mask, and no discomfort to the animal should result. Similarly, the muzzle of the animal is allowed to extend through the opening defined between the jaw strap and the lower edge of the mask. Goggle or shield 22 is immediately adjacent the animals' eyes so that the animal can clearly see and will not become frightened during the application of the spray. The mask is completely secured in place, leaving the user's hands free to apply the treatment. Should any of the substance be inadvertently applied to the area of the animal's eyes, the eyes are completely protected and no irritation or possible damage will result.

After the application of the substance, the mask is removed. If the mask is of the reusable type, it can be conveniently stored, taking up little space, until another application is to be made. Professional or commercial users may wish to simply discard the mask once it is used.

It will be obvious that the general configuration of the mask as shown in the accompanying drawings will be suitable for use with most animals. For example, dogs, cats, sheep, and cattle have basic similarities in their topographical anatomy so that the general configuration of the mask is preferred. Some variation in size of the mask will be desirable for use with larger domestic animals and farm animals. Also, as pointed out above, a wide variety of materials of construction may be used in the fabrication of the mask. Similarly, the configuration of the transparent goggles may vary with the availability of materials and the economical considerations of manufacture. For example, the eye shield or goggle portion 22 may be formed as separate or joined spherical lenses. Similarly, it may be desirable to form the goggle portion from a flat piece of transparent glass or plastic.

It will be obvious from the foregoing that the present invention provides a simple and effective means of preventing eye irritation and damage to animals when applying externally various substances. The mask can be reusable or of a disposable type and can be manufactured at low cost.

It will be obvious to those skilled in the art to make many variations, modifications and changes to the eye protection device described above. To the extent these variations, modifications and changes do not depart from the spirit and scope of the appended claims, they are intended to be encompassed therein.

I claim:

1. An eye protection device adapted to protect an animal during the external application of sprays, dusts and similar substances, comprising:
   a. a substantially moisture impervious flexible mask portion having a general triangular configuration having first, second and third sides, and adapted to snugly engage a portion of the animal's face in the area of the animal's eyes, said mask being constructed of a layered material having an outer fabric layer and an inner substantially waterproof layer having frictional characteristics to engage the animal's face to prevent slipping;
   b. a substantially moisture impervious transparent goggle member in said mask at a location permitting the animal relatively unobstructed vision;
   c. a head strap extending between said first and second sides at a location adjacent said goggle member; and
   d. a jaw strap extending generally parallel to said third side whereby said straps can be respectively engaged about the animal's head and jaws to secure said device in place.

* * * * *